US008908249B2

(12) United States Patent
Ciaudelli et al.

(10) Patent No.: US 8,908,249 B2
(45) Date of Patent: Dec. 9, 2014

(54) WIDE ANGLE HOLOGRAM DEVICE ILLUMINATED WITH A NEAR FIELD SOURCE AND METHOD FOR MANUFACTURING SAME

(75) Inventors: Joseph J. Ciaudelli, Uncasville, CT (US); Thomas Cvetkovich, Youngstown, OH (US)

(73) Assignee: Claudelli Productions, Inc, Uncasville, CT (US)

( * ) Notice: Subject to any disclaimer, the term of this patent is extended or adjusted under 35 U.S.C. 154(b) by 703 days.

(21) Appl. No.: 12/856,504

(22) Filed: Aug. 13, 2010

(65) Prior Publication Data

US 2012/0038959 A1    Feb. 16, 2012

(51) Int. Cl.
| | |
|---|---|
| *G03H 1/20* | (2006.01) |
| *G03H 1/08* | (2006.01) |
| *G03H 1/10* | (2006.01) |
| *G03H 1/12* | (2006.01) |
| *G03H 1/22* | (2006.01) |

(52) U.S. Cl.
CPC ............... *G03H 1/22* (2013.01); *G03H 1/2286* (2013.01); *G03H 1/20* (2013.01); *G03H 2001/207* (2013.01); *G03H 2001/2223* (2013.01); *G03H 2001/2231* (2013.01); *G03H 2001/2234* (2013.01); *G03H 2222/42* (2013.01); *G03H 2222/54* (2013.01); *G03H 2227/06* (2013.01)
USPC ....................... 359/12; 359/9; 359/10; 359/11

(58) Field of Classification Search
USPC ........... 359/9, 10, 11, 20, 23, 24, 25, 28, 103, 359/112, 215, 576, 1, 3, 12; 428/30; 430/1, 430/2; 357/12, 15, 19, 20, 35
See application file for complete search history.

(56) References Cited

U.S. PATENT DOCUMENTS

| | | | | |
|---|---|---|---|---|
| 3,941,450 | A * | 3/1976 | Spitz et al. | 359/20 |
| 4,512,624 | A | 4/1985 | Nicholson | |
| 4,643,515 | A | 2/1987 | Upatnieks | |
| 5,121,229 | A | 6/1992 | Benton et al. | |
| 5,796,500 | A * | 8/1998 | Hart | 359/24 |
| 6,151,142 | A | 11/2000 | Phillips et al. | |
| 6,366,369 | B2 * | 4/2002 | Ichikawa et al. | 359/12 |
| 6,486,982 | B1 * | 11/2002 | Davis | 359/9 |
| 6,614,565 | B1 | 9/2003 | Klug et al. | |
| 2002/0001110 | A1 * | 1/2002 | Metz et al. | 359/10 |
| 2003/0184830 | A1 * | 10/2003 | Takada | 359/15 |
| 2010/0165425 | A1 * | 7/2010 | Tompkin et al. | 359/2 |

FOREIGN PATENT DOCUMENTS

EP    1174751 A2 *  1/2002

* cited by examiner

*Primary Examiner* — Scott J Sugarman
*Assistant Examiner* — Mustak Choudhury
(74) *Attorney, Agent, or Firm* — Frommer Lawrence & Haug LLP

(57) ABSTRACT

A method of manufacturing a master for producing a hologram device is provided. The holographic image reconstructs when the photosensitive film of the hologram device is struck by a beam of light from a wide angle being defined relative to a perpendicular line to a surface of the photosensitive film.

15 Claims, 7 Drawing Sheets

WIDE ANGLE HOLOGRAM DEVICE ILLUMINATED WITH A NEAR FIELD SOURCE AND METHOD FOR MANUFACTURING SAME

BACKGROUND OF THE INVENTION

1. Field of the Invention

This invention relates to holograms and particularly a wide angle hologram device with an image that is reproduced from a near field illuminating source, and method of manufacturing same.

2. Description of Related Art

A hologram or hologram device is a device that includes a photosensitive film containing a recordation of an object. As is well-known, holograms are recorded with coherent light with a reference beam that strikes the photosensitive film directly and an object beam which strikes that object to be recorded and then strikes the film. The angles of these beams in relation to the plane of the film determines how the recorded image will be reproduced from the finished hologram, a process known as reconstruction. The image becomes visible when the hologram is illuminated by an appropriate light source from the same angle of either the reference beam or the object beam that was used during the recording process.

The angle between the reference beam and the object beam used in the recording determines the angle between the reconstructing light source and the reproduced image seen by the viewer that results in reproduction of the recorded image with maximum brightness and minimum distortion. This is often referred to as the "angle of reconstruction". Holograms are often designed so as to be viewed by an observer directly facing the film of the hologram, with the recorded image being reproduced perpendicular to the film of the hologram. Therefore, often times the angle of reconstruction corresponds to an angle with respect to a perpendicular line to the hologram surface.

Generally, either the object beam or the reference beam used to create the hologram is arranged at an angle of approximately 45 degrees with respect to a perpendicular line to the hologram surface, since this geometry is easy to record. In this case, a reconstruction light source positioned at the same angle of approximately 45 degrees with respect to a perpendicular line to the hologram surface is used for reconstruction, since this geometry results in reproduction of the recorded image with maximum brightness and minimum distortion.

Also well known, images from conventional holograms achieve maximum sharpness when reconstructed from collimated light, ideally from a point source. Therefore the light source is positioned at a distance from the hologram which causes the light to be naturally collimated.

FIG. 1A shows reconstruction of a conventional hologram with a distance the light source angled approximately 45 degrees from the hologram. Basically, the light from a light source is well above (or below) the hologram and the viewer.

In many applications, however, it may be advantageous to have a wide angle between the reconstruction beam and a perpendicular line to the film, from a light source positioned close to the hologram, as shown in FIG. 1B. One such application, for example, may be a thin wall display for advertising.

Others have described so-called edge light holograms. U.S. Pat. No. 4,643,515 to Upatnieks describes a technique that provides a monochromatic virtual image at infinity behind an edge-lit hologram. However a compact display is not possible due to reconstruction involving a laser positioned at a distance from the hologram.

A compact system is described in U.S. Pat. No. 5,121,229 to Benton et al., which requires a three-step process to produce a master used for duplication. Furthermore, the recording of Benton is performed using a mask with a slit which sacrifices vertical parallax. Parallax is an apparent displacement or difference in the apparent position of an object viewed along two different lines of sight. For example, a hologram with horizontal parallax means that various horizontal perspectives of the image have been recorded, thereby allowing an observer to view these perspectives as the observer's position changes in a horizontal direction. Sacrificing vertical parallax, as occurs in Benton, means that only the top or the bottom of the image is able to be recorded in the hologram. As a result, an observer will only be able to view one vertical perspective of the image (i.e., either the top or the bottom, but not both), depending on which vertical perspective was recorded. This is the case regardless of whether the observer is viewing the hologram from the top or the bottom of the reconstructed image.

U.S. Pat. No. 4,512,624 to Nicholson describes a two step process for producing a transmission hologram that is reconstructed with a diverging beam of white light. However, this technique also uses a mask during recording and requires a light source position at a distance from the hologram in practical applications. As such, the hologram device of Nicholson does not reconstruct its image when illuminated with a near field source from a wide angle with respect to a perpendicular line to the film of the hologram device. In addition, the Nicholson device also sacrifices some vertical parallax.

U.S. Pat. No. 6,614,565 to Klug et al. describes a one-step process requiring extensive hardware (including computers) and sophisticated image manipulation, and is comparatively expensive.

Thus, it is desirable to provide a low cost, two-step method for creating a hologram device which reconstructs its image when illuminated with a near field source from a wide angle with respect to a perpendicular line to the film of the hologram device.

SUMMARY OF THE INVENTION

According to one embodiment of the present invention, a hologram device is provided which reconstructs an image with maximum brightness and minimum distortion when illuminated from a near field source at wide angle. A photosensitive film is used to record a holographic image of a physical object. Preferably, the holographic image is reconstructed with maximum brightness and minimum distortion when light strikes the hologram at a wide angle defined as a predefined angle that falls within a range of +/−75 degrees to +/−90 degrees, inclusive, relative to a perpendicular line to a surface of the photosensitive film. The holographic image is recreated with low distortions when a light illuminates the photosensitive film at the same wide angle that was used to record the image, even when the illuminating source is physically close to the hologram.

In another embodiment of the present invention, the recreated image has parallax in both the vertical and horizontal planes, such that all perspectives of the image except for the back of the image (i.e., top, bottom, left, right, and front perspectives) have been recorded so that a corresponding perspective is observable by a viewer as the viewer's viewing position of the image changes in either the vertical or horizontal plane.

In yet another embodiment of the present invention, a two step low cost method of making a wide angle hologram that reconstructs with minimal distortions from a near field illumination source is disclosed.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

For image reconstruction, the present hologram invention uses a near field light source angled greater than 75 degrees in relation to the perpendicular of the film plane. In the hologram embodiment shown in FIGS. 4A and 4B, for use as an advertising display, the depth of the display is minimized and the light source is close to the hologram, allowing a compact system.

As is well-known, holograms generally become visible with maximum brightness and minimum distortion when a light beam strikes the surface of the hologram at the same angle as the reference beam or object beam that was used during recording of the object image, measured with respect to a perpendicular line to the hologram surface.

Figure 1A:
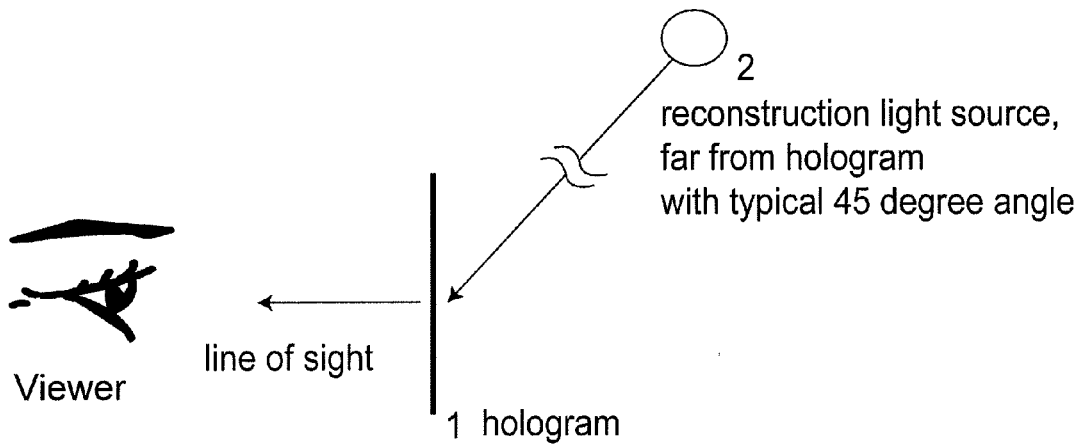
FIG. 1A illustrates reconstruction of a conventional hologram.

Thus, when light from a light source strikes the hologram at the same angle at which the image was recorded, the image becomes visible. As shown in FIG. 1A, the angle between the reconstructing beam and the perpendicular to the film plane in a conventional hologram is approximately 45 degrees, and the light source is far from the hologram. Basically, the light from a light source 2 is well above both the hologram 1 and the viewer.

Figure 1B:
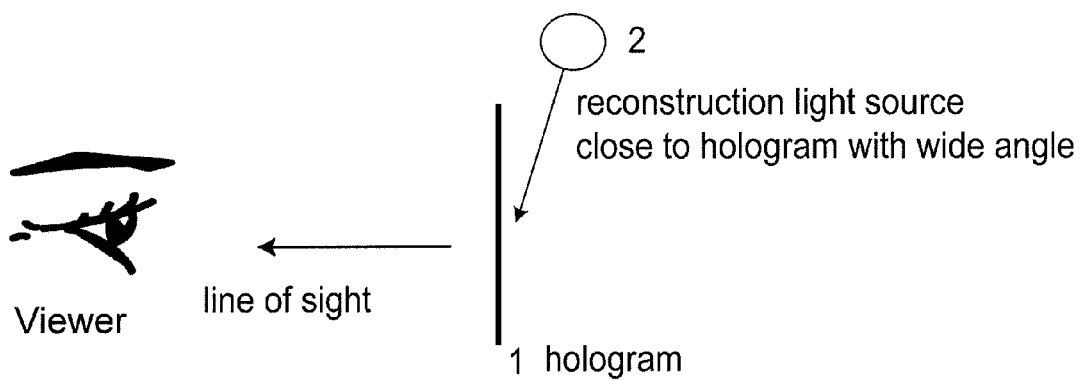
FIG. 1B illustrates reconstruction of a wide angle hologram.

As shown in FIG. 1B, however, in some applications it is advantageous to have a hologram that reconstructs from a light source that is angled wider than 45 degrees with respect to a perpendicular line to the hologram, and that is positioned close to the film.

Generally, a master hologram plate is used to mass produce hologram copies. One of the main differences between the master holograms and the hologram copies is that an image with its own, independently set diffraction pattern is transferred onto a master hologram, whereas the exact diffraction pattern of a master hologram is what is transferred onto a hologram copy. More specifically, the object beam and the reference beam used to create a master can be set independently from one another. In this way, each master hologram has its own, independently set, angle of reconstruction. This is the case even if an image from one master hologram is used to create another master hologram. However, the object beam and the reference beam used to create a hologram copy are defined by the master hologram used to create the copy. In this way, each hologram copy necessarily has the same angle of reconstruction as that of the master hologram from which the hologram copy was created.

Preferably, two master holograms are created. In the first step, a first master hologram records the object to be imaged. In the second step, the image from the first master hologram is transferred to the final master hologram. This two master technique is used to locate the holographic image close to or subtending the film plane of the second master hologram, in order to achieve greater brightness and clarity for subsequent white light illumination. The final master hologram is then used to make hologram copies.

Both the first master hologram and the second master hologram are created by exposing a holographic plate (or film) to optically manipulated laser light in a darkened room. Careful consideration needs to be made to avoid optical noise and physical vibration, which would distort or destroy the image. Possible vibration free configurations include, for example, (1) using a pulse laser as the light source, or (2) affixing all components to a table isolated from structure-borne room noise. The former creates a high energy flash that freezes any microscopic movement. The latter can be created in an enclosed room with a vibration isolated optical table.

The holographic film or plates are stored in light tight boxes until ready for exposure. After the exposures the plates are processed (typically using chemicals) to develop the recorded image and make them safe to be exposed to normal light levels.

In one embodiment, a continuous wave Krypton laser with a wavelength of 413 nm was used to make the recording. Other suitable lasers operating at different frequencies can also be used, such as a diode pumped solid state YAG laser operating at 532 nm.

Figure 2A:
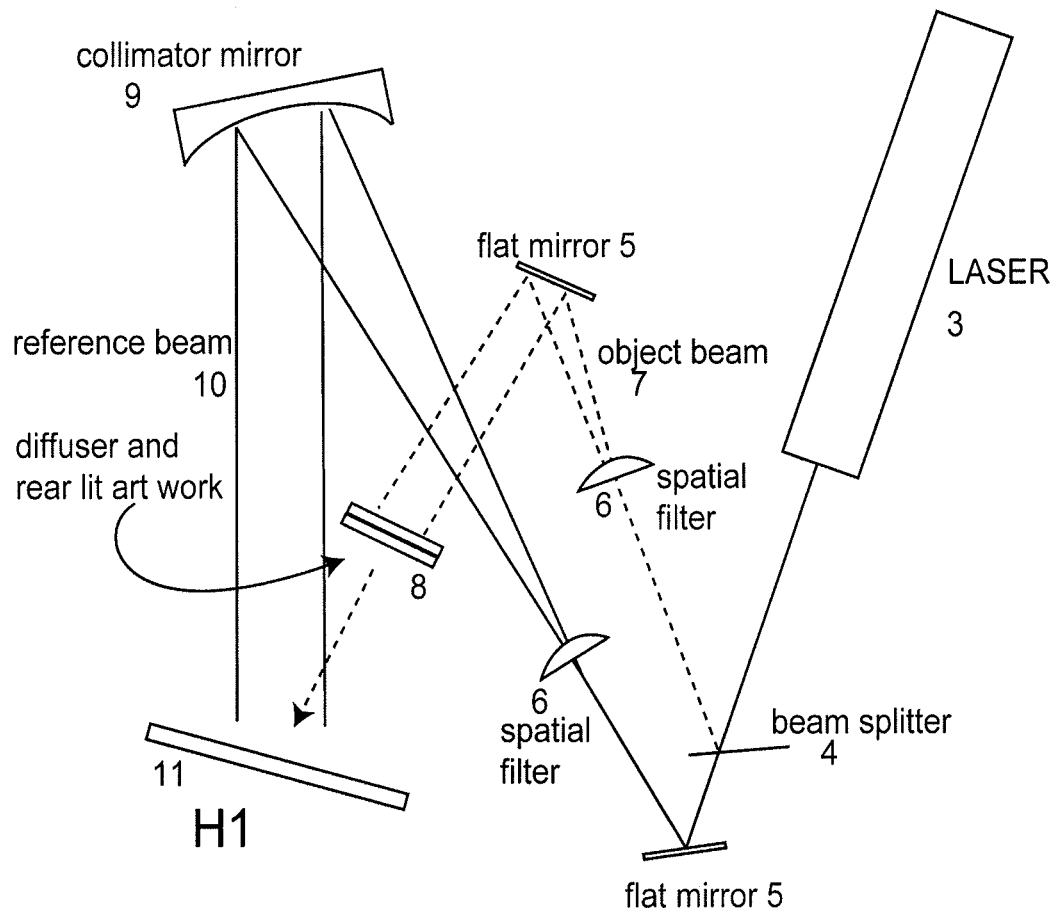
FIG. 2A illustrates recording of H1 "shadowgram" hologram.
Figure 2B:
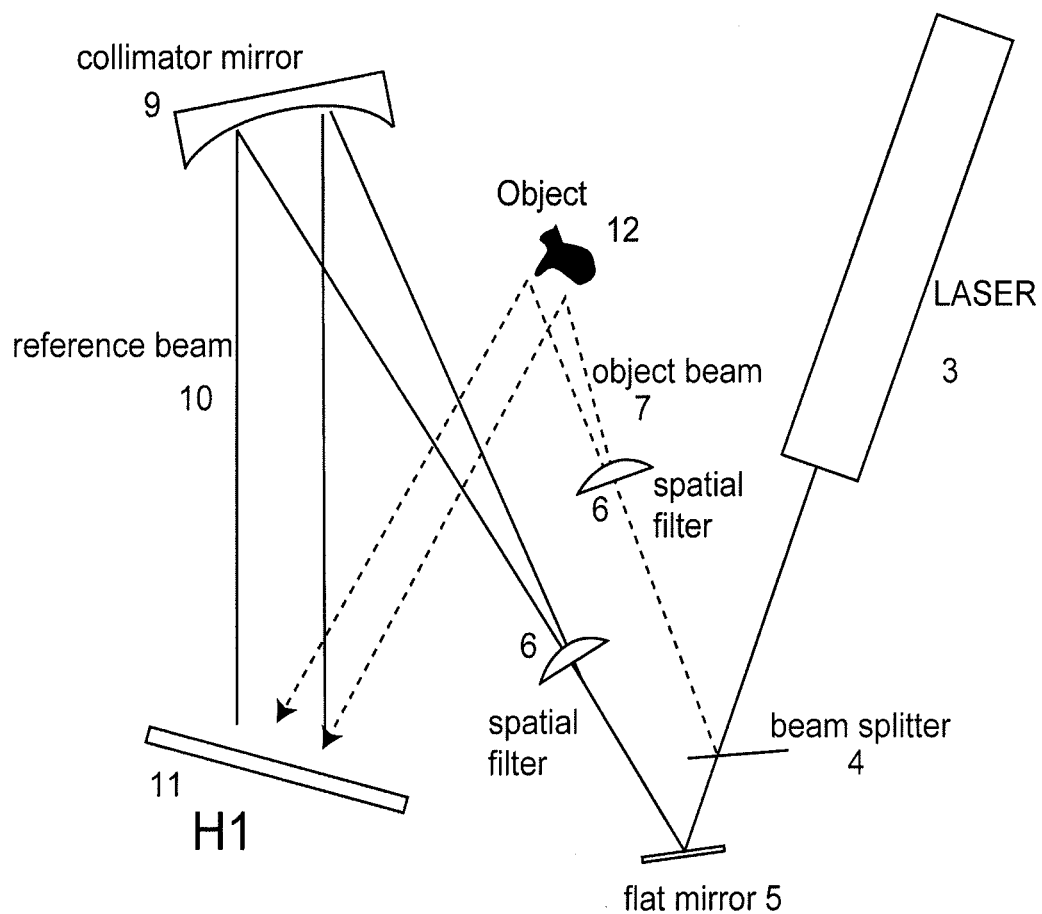
FIG. 2B illustrates recording of H1 hologram of opaque object.

FIG. 2A illustrates an embodiment of the creation of the first master hologram 11 ("H1"). Using a beam splitter 4, the beam from laser 3 is divided in two: a reference beam 10 and an object beam 7. The reference beam 10 and the object beam 7 are each redirected by a mirror 5 and expanded with optics, preferably spatial filters 6. The reference beam 10 is collimated with a collimating mirror 9, or other optic, to stop its divergence and create a parallel wave front. The reference beam 10 goes directly to a holographic plate of the first master hologram 11. At the same time, the object beam 7 is directed to a ground glass with the transparent artwork 8 affixed to it, transmitting through it, then onto the holographic plate of the first master hologram 11. This type of hologram is sometimes referred to as a shadowgram. FIG. 2B shows a similar arrangement for an opaque object 12.

Once the exposed first master hologram 11 is processed, it becomes a laser viewable transmission hologram. The recorded image is reconstructed (becomes visible) when exposed to laser light from the rear at the same angle as the reference beam or object beam that was set during the original recording.

Figure 3A:
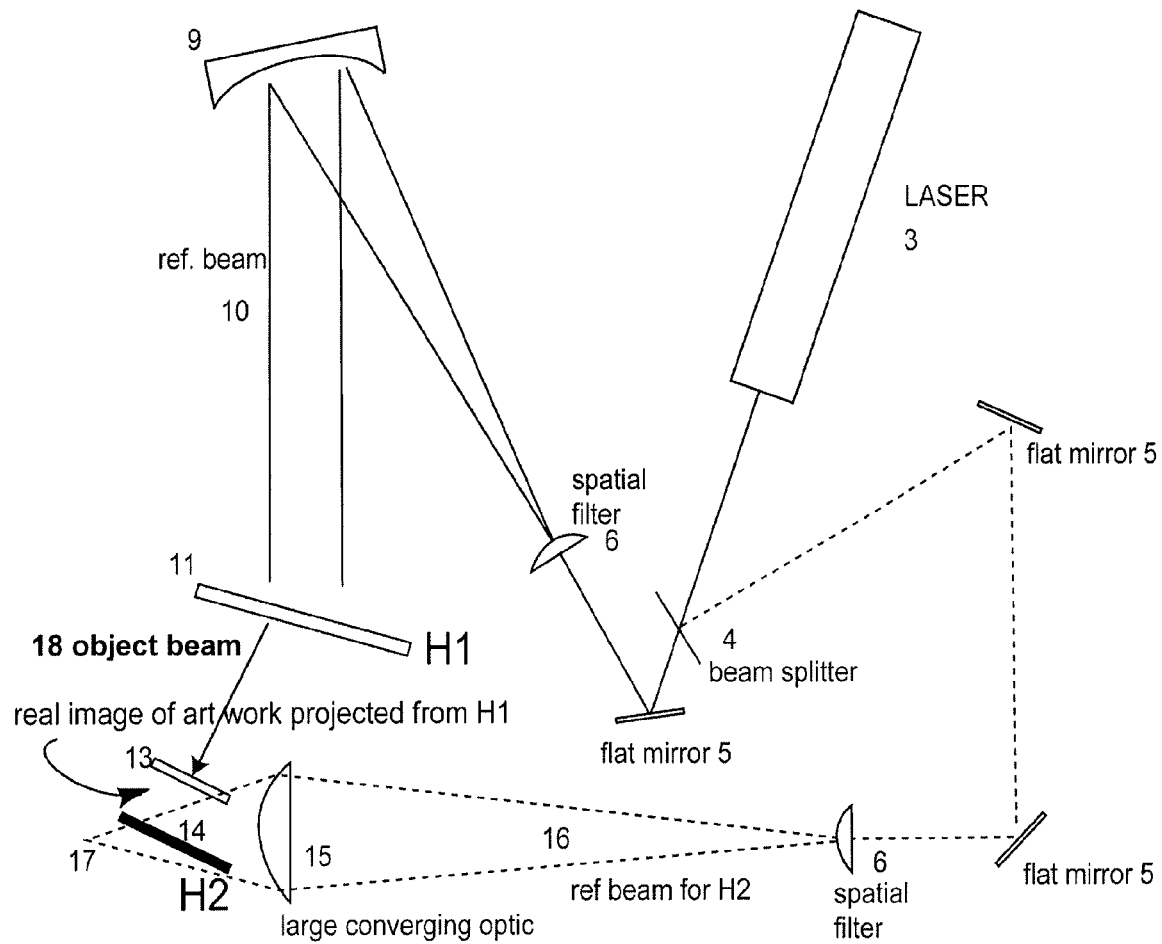
FIG. 3A illustrates H1 to H2 transfer using diverging lens.

Next, the image recorded on the first master hologram 11 is reconstructed and transferred to the second master hologram. FIG. 3A shows the transfer process where the reconstructed image 13 from the first master hologram 11 is recorded on to the second master hologram 14 ("H2"). The beam from laser 3 is divided in two legs by a beam splitter 4. Each leg is redirected by a mirror 5, expanded by a spatial filter 6.

Beam 10 is collimated with a mirror 9 or other optic, and then strikes the rear surface of the first master hologram 11 at the same angle as the reference beam 10 used to create the first master hologram 11. This is known in the art as reconstruction with a conjugate beam. This causes a focused image of the object recorded in the first master hologram 11 to be reconstructed.

At the same time, the other leg acts as the reference beam 16 for the second master hologram 14, and then strikes the surface of the second master hologram 14 to record an image that can reconstruct from a wide angle which, in this case, is measured relative to the perpendicular line to the surface of the second master hologram 14. The image reconstructed by the first master hologram 11 is then recorded in the second master hologram 14. Afterwards, the exposed second master hologram 14 is processed in a conventional manner. The second master hologram 14 is then used to make hologram copies.

For applications such as compact displays it is desirable to locate the reconstruction light source as close to the hologram as possible without forming distortions in the image. In production, this requires exposing the plate of the second master hologram 14 to a rapidly converging reference beam 16 that has a focal point 17 beyond the plate of the second master hologram 14. This results in a rapidly diverging conjugate beam in the reconstruction process.

In making a standard hologram, after the reference beam is initially spread with the spatial filter, the light is collimated so the holographic plate is exposed to a parallel wavefront. To reconstruct, ideally the light source is far from the film so by the time it hits the hologram it is naturally collimated. This creates a sharp image with no or low distortions. However, for display with minimal depth, the reconstructing light will be very close to the film. In this case, the wavefront of the light source will still be curved when it hits the hologram. To prevent image distortions, compensation is introduced by converging (bending in together) the wavefront of the reference beam for the second master hologram 14 with a lens 15. This records curved fringes on the second master hologram 14 in a reverse geometry (conjugate) to the diverging (spreading) LED beam. The arrangement in FIG. 3A requires a converging lens 15 that is large (at least 2×) in relation to the hologram.

Figure 3B:
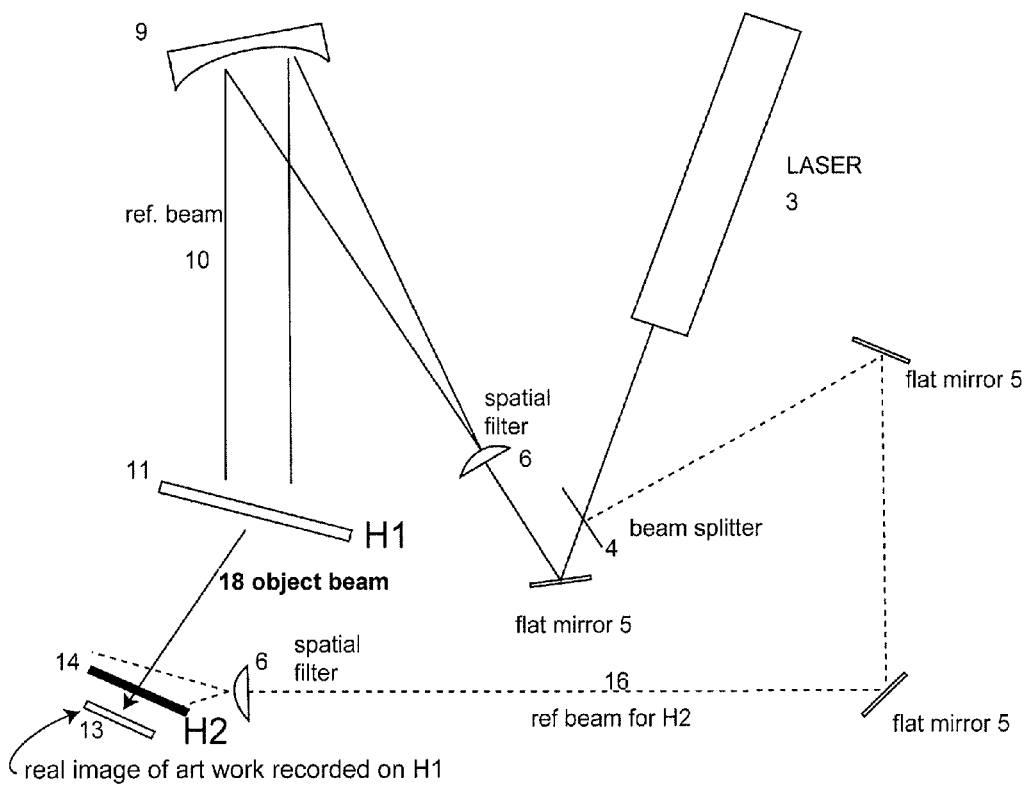
FIG. 3B illustrates H1 to H2 transfer using converging lens.

FIG. 3B shows an alternate arrangement where this light is diverged before hitting and close to the second master hologram 14 with a spatial filter 6 or a lens. A much smaller and less expensive lens can be used in this configuration compared to the large lens 15 in FIG. 3A. The technique in FIG. 3B records a pseudoscopic image from the first master hologram 11, rather than an orthoscopic image, and reconstructs the pseudoscopic image in the final display. The pseudoscopic image will have reverse depth of the recorded object in relation to the film, the point on the object closest to the film during recording appear to be the furthest and visa versa. This is of no consequence for 2D images and shadowgrams such as the artwork 8 in FIG. 2A.

This process applies to both transmission and reflection holograms. Reflection holograms being made with variations primarily by exposing the second master hologram to a reference beam from a side of the plate of the second master hologram facing away from the projected image of the first master hologram.

Figure 4A:
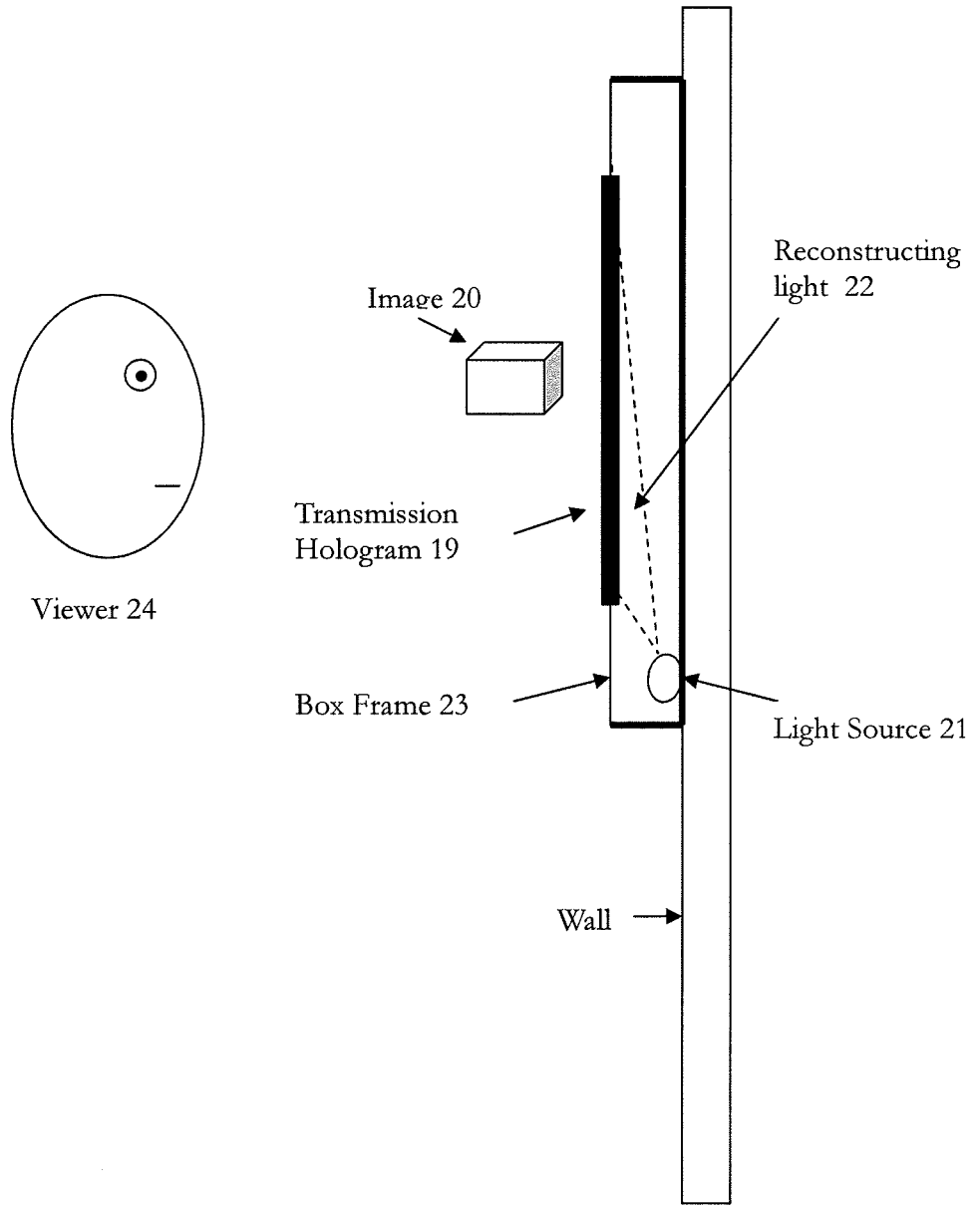
FIGS. 4A and 4B illustrate an illumination arrangement of a hologram device.
Figure 4B:
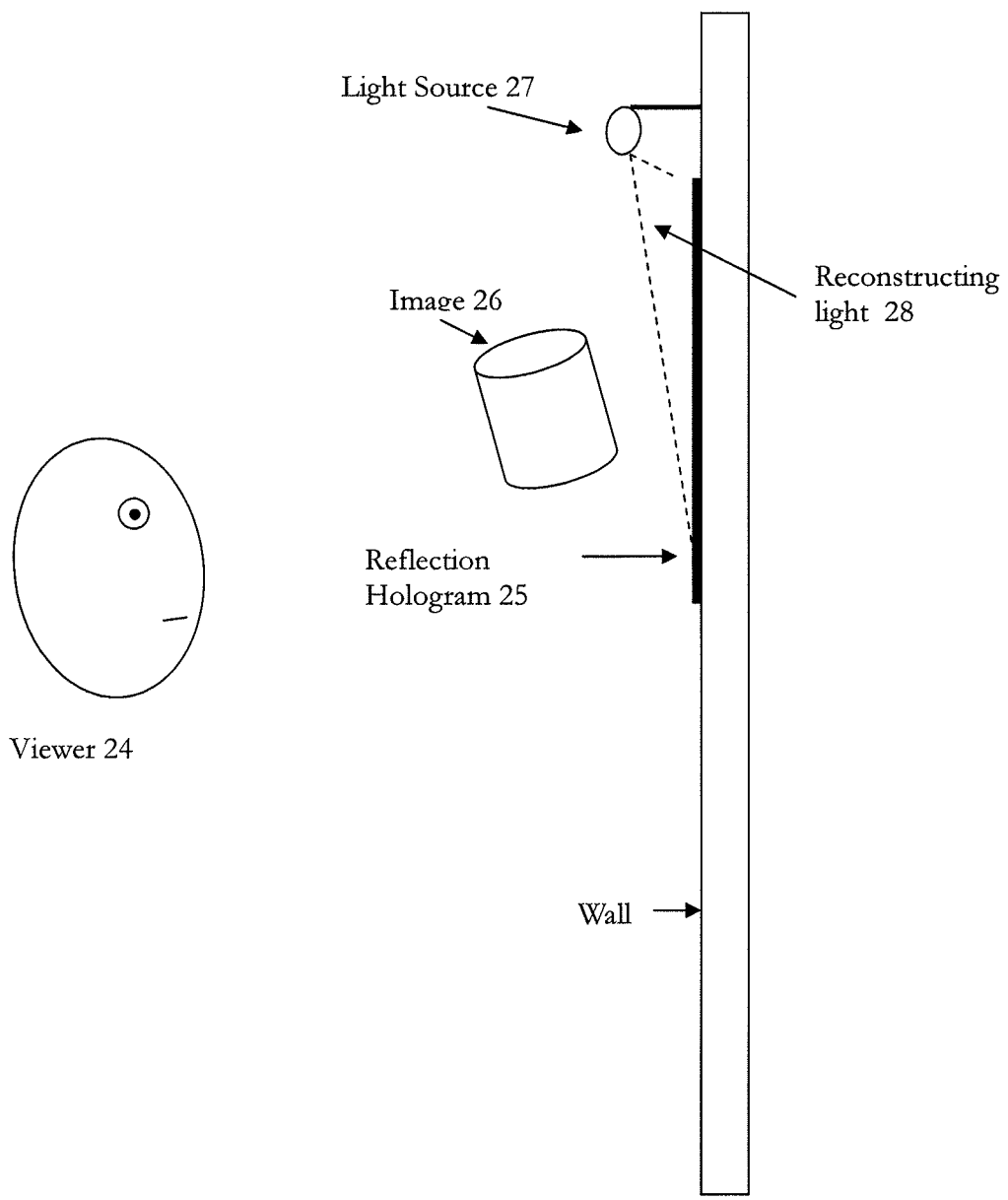

FIG. 4A shows a suggested geometry for a final, self-contained display. A transmission hologram 19 is mounted in a box frame 23, and is illuminated by a light source 21 (e.g., an LED) positioned below and close to the hologram at an angle of approximately 80 degrees relative to the perpendicular of the hologram. The light source provides the reconstructing light 22 that makes the recorded image 20 visible to the viewer 24. The light source can also be designed to be mounted at the bottom of the box frame. FIG. 4B shows an arrangement for a reflection hologram that is not enclosed in a frame, and that is illuminated from a light above the hologram.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS 1 display hologram
2 light source
3 laser
4 beam splitter
5 flat mirror
6 spatial filter
7 object beam
8 diffuser and flat art work
9 collimating optic
10 reference beam for H1
11 hologram H1
12 3D object
13 real image holographic projection from H1
14 H2 display hologram master
15 large converging optic, lens mirror or Holographic optical element
16 reference beam for H2
17 focal point of reference beam for H2
18 object beam for H2
19 final transmission hologram
20 recorded image of transmission hologram
21 light source for transmission hologram display
22 reconstructing light in transmission hologram display
23 box frame
24 viewer
25 reflection hologram
26 recorded image of reflection hologram
27 light source for reflection hologram
28 reconstructing light for reflection hologram

What is claimed is:

1. A wide angle near-field illuminated hologram device comprising:
    a photosensitive film; and
    a holographic image recorded in the photosensitive film;
    wherein the holographic image reconstructs when the film is struck by a beam of light from a wide angle being defined as a predefined angle that falls within a range of 75 degrees to 90 degrees, inclusive, as an absolute value relative to a perpendicular line to a surface of the photosensitive film; and
    wherein the holographic image is reconstructed when a light from a near field source, defined as a source that is positioned closer to the hologram than a largest dimension of the hologram device itself, illuminates the photosensitive film at the wide angle.

2. The wide angle near-field illuminated hologram device according to claim 1;
wherein the wide angle is a predefined angle that falls within a range of 85 degrees to 90 degrees, inclusive, as an absolute value relative to a perpendicular line to a surface of the photosensitive film.

3. The wide angle near-field illuminated hologram device according to claim 1;
wherein the holographic image is recorded in the photosensitive film from another holographic image generated by another hologram device.

4. The wide angle near-field illuminated hologram device according to claim 1;
wherein the hologram device is a transmission hologram device in which a viewer and the light source are on opposite sides of the hologram device.

5. The wide angle near-field illuminated hologram device according to claim 4;
wherein the wide angle is a predefined angle that falls within a range of 85 degrees to 90 degrees, inclusive, as an absolute value relative to a perpendicular line to a surface of the photosensitive film.

6. The wide angle near-field illuminated hologram device according to claim 4;
wherein the holographic image is recorded in the photosensitive film from another holographic image generated by another hologram device.

7. The wide angle near-field illuminated hologram device according to claim 4;
wherein the holographic image is recorded in the photosensitive film directly from a physical object which forms the image.

8. The wide angle near-field illuminated hologram device according to claim 1;
wherein the hologram device is a reflection hologram device in which a viewer and the white light source are on the same side of the hologram device.

9. The wide angle near-field illuminated hologram device according to claim 8;
wherein the narrow angle is a predefined angle that falls within a range of 85 degrees to 90 degrees, inclusive, as an absolute value relative to a perpendicular line to a surface of the photosensitive film.

10. The wide angle near-field illuminated hologram device according to claim 8;
wherein the holographic image is recorded in the photosensitive film from another holographic image generated by another hologram device.

11. The wide angle near-field illuminated hologram device according to claim 8;
wherein the holographic image is recorded in the photosensitive film directly from a physical object which forms the image.

12. A method of making the wide angle near-field illuminated hologram device according to claim 1, comprising:
utilizing a converging lens system to record the holographic image as an orthoscopic image in the photosensitive film.

13. A method of making the wide angle near-field illuminated hologram device according to claim 1, comprising:
utilizing a diverging lens system to record the holographic image as a pseudoscopic image in the photosensitive film.

14. The wide angle near-field illuminated hologram device according to claim 1;
wherein the holographic image is recorded in the photosensitive film directly from a physical object which forms the image.

15. The wide angle near-field illuminated hologram device according to claim 1;
wherein the holographic image reconstructs when a side of the film, which is not covered by another light-manipulating material which aids in the reconstruction of the holographic image, is struck by the beam of light from the wide angle.

* * * * *